(12) United States Patent
Ruppert

(10) Patent No.: US 11,524,592 B2
(45) Date of Patent: Dec. 13, 2022

(54) MOBILE DISCHARGING DEVICE FOR AN ENERGY STORAGE DEVICE

(71) Applicant: AUDI AG, Ingolstadt (DE)

(72) Inventor: Daniel Ruppert, Lenting (DE)

(73) Assignee: AUDI AG, Ingolstadt (DE)

( * ) Notice: Subject to any disclaimer, the term of this patent is extended or adjusted under 35 U.S.C. 154(b) by 365 days.

(21) Appl. No.: 16/419,588

(22) Filed: May 22, 2019

(65) Prior Publication Data

US 2019/0379225 A1 Dec. 12, 2019

(30) Foreign Application Priority Data

Jun. 8, 2018 (DE) .......................... 102018209107.2

(51) Int. Cl.
*B60L 53/16* (2019.01)
*H01M 10/44* (2006.01)

(52) U.S. Cl.
CPC ............. *B60L 53/16* (2019.02); *H01M 10/44* (2013.01); *H02J 2207/20* (2020.01)

(58) Field of Classification Search
CPC ...... B60L 53/16; H01M 10/44; H02J 2207/20
USPC ....................................................... 320/135
See application file for complete search history.

(56) References Cited

U.S. PATENT DOCUMENTS

| 2013/0200855 | A1* | 8/2013 | Christensen .............. B60L 3/04 320/136 |
| 2013/0307480 | A1* | 11/2013 | Boggs ..................... B60L 58/15 320/118 |
| 2014/0042806 | A1 | 2/2014 | Gless |
| 2014/0117942 | A1* | 5/2014 | Fisher ............... H02J 7/007182 320/136 |
| 2016/0288648 | A1* | 10/2016 | Klapper ................. B60L 53/14 |
| 2016/0288664 | A1 | 10/2016 | Biagini et al. |
| 2019/0067954 | A1* | 2/2019 | Ohkawa .................. B60L 58/12 |

FOREIGN PATENT DOCUMENTS

| DE | 102008032100 A1 | 2/2009 |
| DE | 102012202465 A1 | 8/2012 |
| DE | 102016106840 A1 | 10/2017 |
| WO | 2015/078813 A1 | 6/2015 |
| WO | 2017130614 A1 | 8/2017 |

OTHER PUBLICATIONS

Machine translation of DE102016106840 performed on Aug. 25, 2021, 56 pages (Year: 2021).*
German Examination Report dated Apr. 30, 2019 in corresponding German Application No. 10 2018 209 107.2; 19 pages.
European Search Report dated Nov. 7, 2019, in connection with EP Application No. 19173506.7 (10 pgs., including machine-generated English translation).
Office Action dated Jul. 19, 2022 in corresponding Chinese Application No. 201910486250.3, 14 pages (including English translation).

* cited by examiner

*Primary Examiner* — Nathaniel R Pelton
(74) *Attorney, Agent, or Firm* — Maier & Maier, PLLC

(57) ABSTRACT

A mobile discharging device for an energy storage device of an electric vehicle and to a method for operating the device.

8 Claims, 2 Drawing Sheets

MOBILE DISCHARGING DEVICE FOR AN ENERGY STORAGE DEVICE

FIELD

The invention relates to a mobile discharging device for an energy storage device of an electric vehicle and to a method for operating the device.

BACKGROUND

Today's electric vehicles generally have two possibilities for charging the high-voltage storage device of the vehicle (the traction battery). Charging can occur via a conventional AC voltage (AC charging, for example, with a 11 kW charging capacity) or via a DC voltage (DC charging, for example, with a 150 kW charging capacity).

Both charging possibilities require separate validation, testing and release. This represents a challenge in the case of BEVs (Battery Electric Vehicles) of the newest generation which have ranges of 500 km, since the charging test can only occur with an empty traction battery. Currently, the only possibility available is to drive the vehicle again until it is "empty" after each full charging test. In the case of an average range of 500 km, this leads to considerable development costs, longer testing times, and a loss in terms of test duration or test times. In addition, it requires a registered driver who has a prototype driver's license.

DE 10 2012 202 465 A1 discloses a current supply system with a charging/discharging device which can be connected to a vehicle and can charge or discharge an electric energy storage device of the vehicle.

From DE 10 2008 032 100 A1, a capacitor arrangement and a current supply for a vehicle with such a capacitor arrangement are known. The capacitor arrangement of the vehicle is discharged by plugging in an adapter.

From US 2014/042806 A1, a safety system for vehicles for reducing a risk of electrical shock caused by a battery is known. This safety device comprises a method for discharging the battery before a recycling process.

SUMMARY

On this background, the aim of the present invention is to at least partially eliminate the disadvantages of the prior art.

The aim is achieved according to the invention by a device having the features of claim 1 and by a method having the features of claim 8. Embodiments and developments of the invention result from the dependent claims.

The subject matter of the invention is a mobile discharging device ("mobile discharging station") for an energy storage device of an electric vehicle. The energy storage device is, for example, a high-voltage battery (HV battery) which is used as traction battery.

The discharging device comprises at least one first CCS plug which is connected via a charging cable to the device and is configured to be connected to a charging socket of the electric vehicle, means for transforming electric energy taken from the energy storage device into heat, means for transforming electric energy taken from the energy storage device into AC current and/or means for transforming electric energy taken from the energy storage device into DC current, and a control device which is configured to control the discharge process.

The device according to the invention comprises at least one CCS plug which is connected via a charging cable to the device and is configured to be connected to a charging socket (vehicle-side charging socket) of the electric vehicle. CCS stands for "Combined Charging System." The corresponding plugs are defined in IEC 62196, Part 3. In an embodiment, the plug is of type 2. This type is standard in Europe. In another embodiment, the plug is of type 1. This type is common mainly in the USA. The discharging of the energy storage device of the vehicle occurs via the charging socket with the aid of the DC voltage.

The discharging device can utilize the extracted charging capacity in different manners:
  Transformation of the extracted power into heat at low discharging capacity (up to 20 kW);
  Re-feeding of the extracted charging capacity (up to 20 kW) to the AC grid (in-house grid);
  Re-feeding of the extracted charging capacity to another electric vehicle (up to 150 kW).

Depending on the design of the discharging device according to the invention, combinations of the utilization types can be used.

In an embodiment, the means for transforming the electric energy taken from the energy storage device into heat comprise at least one electric resistor. The discharge current is run through the at least one electrical resistor and converted there into heat.

In an additional embodiment, the means for transforming the electric energy taken from the energy storage device into AC current comprise an inverter, the output of which is connected to a three-phase plug. The three-phase plug can be connected to an AC current grid, for example, an in-house grid, and the AC current generated in the device is fed into the grid.

In an additional embodiment, the means for transforming the electric energy taken from the energy storage device into DC current comprise a DC converter (DC/DC converter), the output of which is connected to at least one second CCS plug which is configured to be connected to a charging socket of a second electric vehicle. The energy storage device of the second electric vehicle can then be charged with the electric energy taken from the energy storage device of the first electric vehicle. It is also possible to connect several charging cables with CCS plugs to the output of the DC/DC converter. Then, multiple additional electric vehicles can be connected, and the energy storage devices thereof can be charged.

The control device of the discharging device according to the invention is configured to control the discharge process. In an embodiment of the discharging device, the control device is configured to communicate via PLC (Power Line Communication) with the electric vehicle or with the electric vehicles. In an additional embodiment, the control device is configured to monitor the discharge current and the discharge voltage during the discharge process, and to control the discharge process in such a manner that a predetermined maximum discharge current is not exceeded, and a predetermined minimum discharge voltage is not undershot. In an additional embodiment, the control device is configured to ensure that, after the discharge process, a predetermined remaining capacity (SoC) remains in the discharged energy storage device. The predetermined remaining capacity can be, for example, 5% of the rated capacity of the energy storage device. Thus, when, during the discharge process, a residual charge of 5% of the energy storage device is reached, the control device interrupts the discharge process.

An additional subject matter of the invention is a method for discharging an energy storage device of an electric vehicle by means of the discharging device according to the invention. Here, the at least one first CCS plug of the device is plugged into a charging socket of the electric vehicle, and, via the discharging cable, electric energy (in the form of DC current) is taken from the energy storage device of the electric vehicle and routed into the device. In an embodiment of the method, the control device of the device controls the discharge current and the discharge voltage and interrupts the discharge process when the residual charge (SoC) of the energy storage device reaches a predetermined threshold value (for example, 5%). The electric energy taken from the energy storage device is transformed in the device as desired into heat, AC current and/or DC current. In an embodiment of the method, the energy storage device of a second electric vehicle is charged with the electric energy taken from the energy storage device. This method enables a savings of energy and costs, since the vehicle which is discharged can charge the energy storage device of another vehicle.

The device according to the invention and the method according to the invention make it possible to reduce the development costs in the development of the battery and the process, since there is no need for a driver to "drive empty" the energy storage device, and the time loss associated therewith is eliminated. The device and the method enable shorter test times, since the test time can be used exclusively for charging tests, and a smaller number of test vehicles is necessary.

Additional advantages and embodiments of the invention result from the description and the appended drawings.

It is understood that the above-mentioned features and the features which are to be explained in further detail below can be used not only in the respective indicated combination but also in other combinations or individually, without leaving the scope of the present invention.

BRIEF DESCRIPTION OF THE DRAWINGS

The invention is represented diagrammatically based on embodiments in the drawings and is described diagrammatically and in detail in reference to the drawings. The figures show.

DETAILED DESCRIPTION

Figure 1:
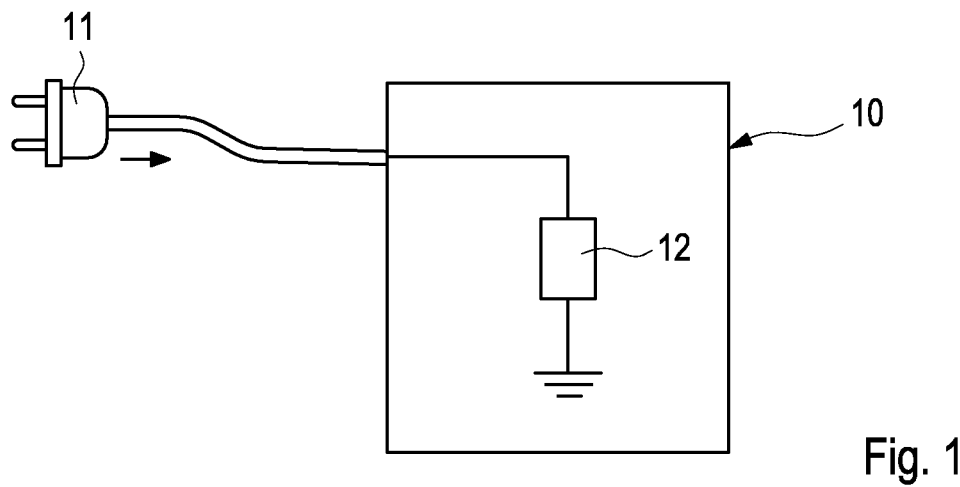
FIG. 1 a diagrammatic representation of an embodiment of the discharging device according to the invention.

FIG. 1 diagrammatically shows an embodiment of the discharging device 10 according to the invention with a CCS plug 11 connected thereto via a charging cable. If the CCS plug 11 is connected to the charging socket of an electric vehicle, then the energy storage device thereof is discharged via a resistor 12 in the device 10, which converts the extracted power into heat. Typically, the discharging capacity in this embodiment is up to 20 kW. The arrow indicates the power flow from the connected electric vehicle.

Figure 2:
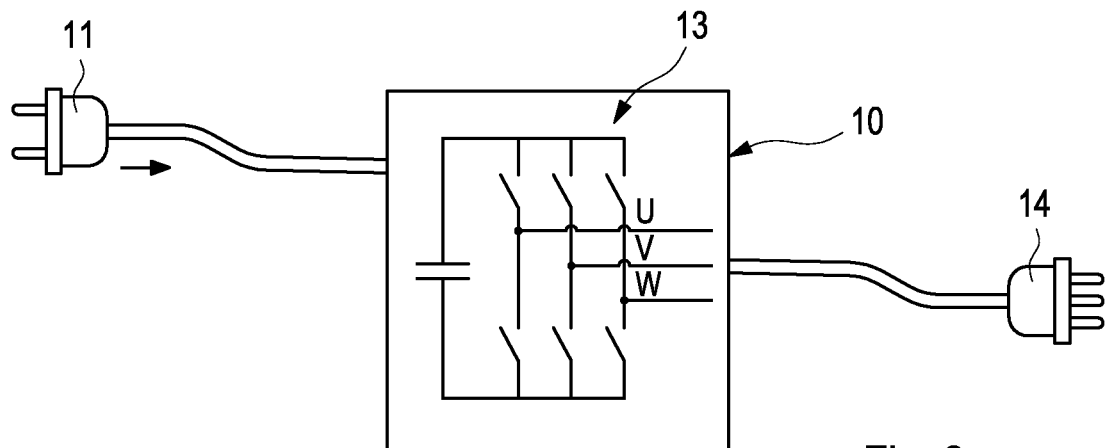
FIG. 2 a diagrammatic representation of another embodiment of the discharging device according to the invention.

FIG. 2 diagrammatically shows another embodiment of the discharging device 10 according to the invention with a CCS plug 11 connected thereto via a charging cable. If the CCS plug 11 is connected to the charging socket of an electric vehicle, then the energy storage device thereof is discharged via an inverter 13 in the device 10, which converts the extracted power into three-phase AC current which is discharged via a three-phase plug 14 and re-fed into an AC current grid (in-house grid), for example. Typically, the discharging capacity in this embodiment is up to 20 kW. The arrow indicates the power flow from the connected electric vehicle.

Figure 3:
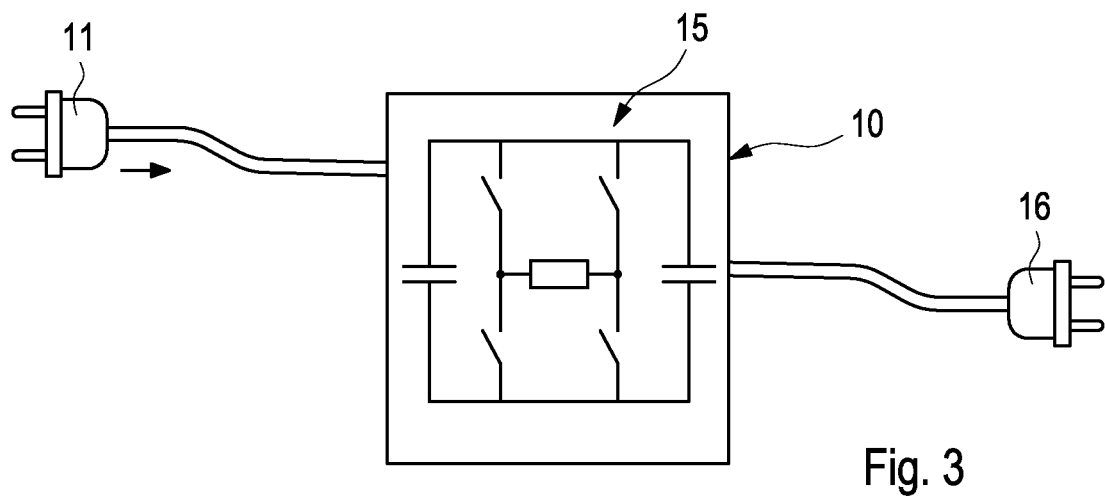
FIG. 3 a diagrammatic representation of an additional embodiment of the discharging device according to the invention.
Figure 4:
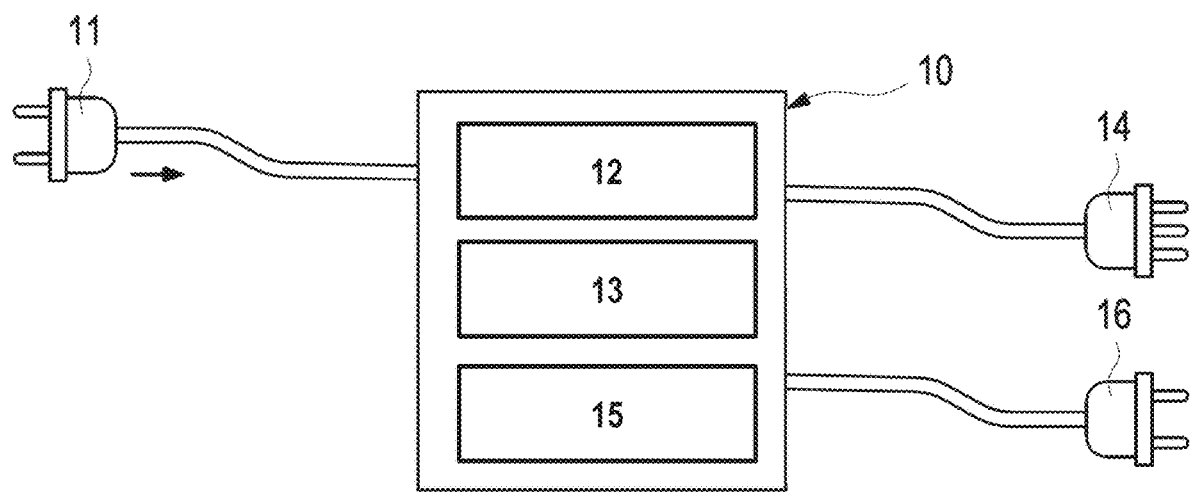
FIG. 4 a diagrammatic representation of an additional embodiment of the discharging device according to the invention.

FIG. 3 diagrammatically shows an additional embodiment of the discharging device 10 according to the invention with a CCS plug 11 connected thereto via a charging cable. If the CCS plug 11 is connected to the charging socket of an electric vehicle, then the energy storage device thereof is discharged via a DC converter 15 (DC/DC converter) in the device 10, which supplies the extracted power via a second charging cable with a second CCS plug 16 to the charging socket of a second electric vehicle, in order to charge the energy storage device thereof. In this embodiment the discharging capacity is typically up to 150 kW. The arrow indicates the power flow from the connected electric vehicle.

The invention claimed is:

1. A mobile discharging device for an energy storage device of an electric vehicle, comprising:
   at least one first CCS plug which is connected via a charging cable to the device and is connected to a charging socket of the electric vehicle;
   at least one electric resistor by which electric energy taken from the energy storage device is dissipatable at a rate of up to 20 kW as heat;
   an inverter by which electric energy taken from the energy storage device may be converted into AC current;
   a DC converter by which electric energy taken from the energy storage device may be converted into DC current; and
   a control device which is configured to control a discharge process,
   wherein the mobile discharging device is configured to transfer electricity from the energy storage device to a power grid, and
   wherein the control device controls the discharge process so that a predetermined maximum discharge current is not exceeded, and a predetermined minimum discharge voltage is not undershot.

2. The mobile discharging device according to claim 1, wherein an output of the inverter is connected to a three-phase plug.

3. The mobile discharging device according to claim 1, wherein an output of the DC converter is connected to at least one second CCS plug which is configured to be connected to a charging socket of a second electric vehicle.

4. The mobile discharging device according to claim 1, wherein the control device communicates via a Power Line Communication protocol with the electric vehicle.

5. The mobile discharging device according to claim 1, wherein the control device ensures that a predetermined remaining capacity remains in the energy storage device after the discharge process.

6. A method for discharging an energy storage device of an electric vehicle via a discharging device, comprising:
   plugging at least one first CCS plug into a charging socket of the electric vehicle, the at least one first CCS plug connected to or connectable to the discharging device; and
   transferring electric energy from the energy storage device of the electric vehicle via the at least one first CCS plug into the discharging device,
   wherein the discharging device comprises:

at least one electric resistor by which electric energy taken from the energy storage device is dissipatable at a rate of up to 20 kW as heat;

an inverter by which electric energy taken from the energy storage device may be converted into AC current;

a DC converter by which electric energy taken from the energy storage device may be converted into DC current; and a control device which is configured to control a discharge process, wherein the discharging device is configured to transfer electricity from the energy storage device to a power grid, and wherein the control device controls the discharge process so that a predetermined maximum discharge current is not exceeded, and a predetermined minimum discharge voltage is not undershot.

7. The method according to claim 6, wherein the control device controls a discharge current and a discharge voltage and interrupts the discharge process when a residual charge of the energy storage device has reached a predetermined threshold value.

8. The method according to claim 6, wherein the energy storage device of a second electric vehicle is charged with the electric energy taken from the energy storage device.

* * * * *